July 21, 1953 E. G. REID 2,645,941
ATMOSPHERIC DUST COLLECTOR
Filed June 19, 1952 3 Sheets-Sheet 1

INVENTOR.
ELLIOTT G. REID
BY
Roland A. Anderson
ATTORNEY.

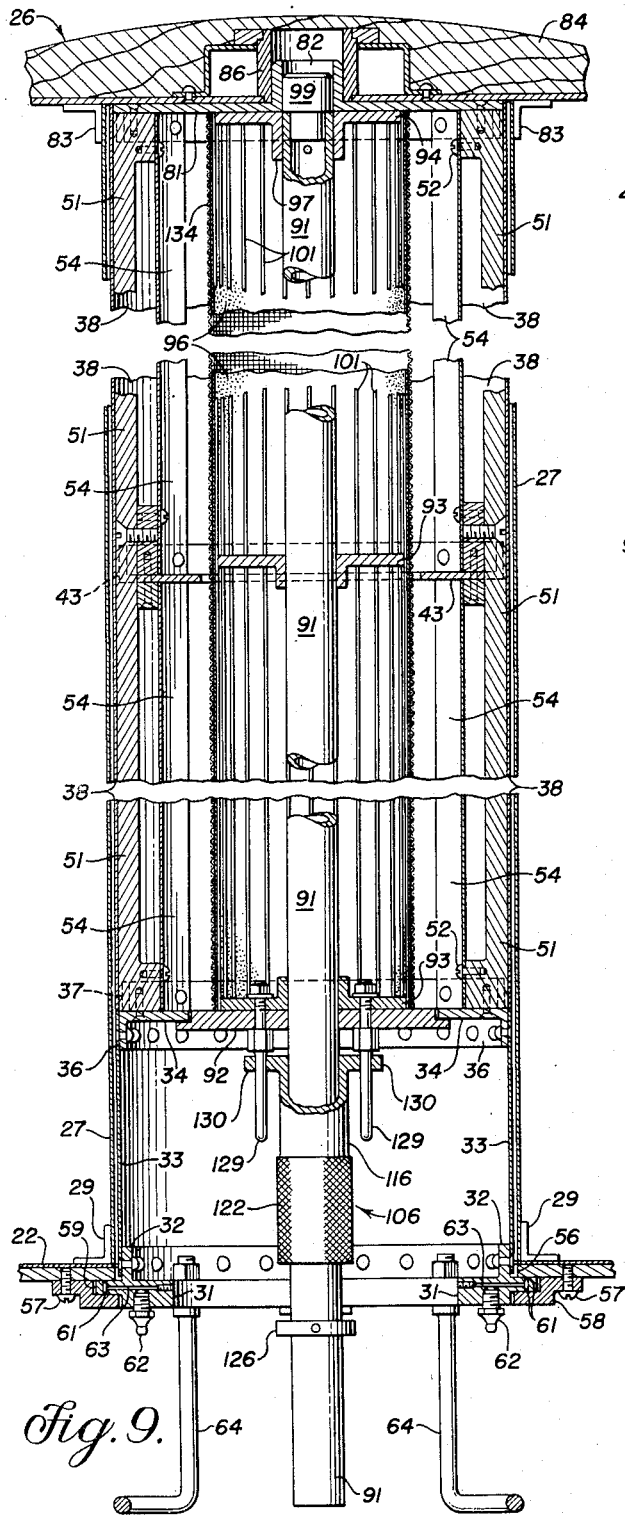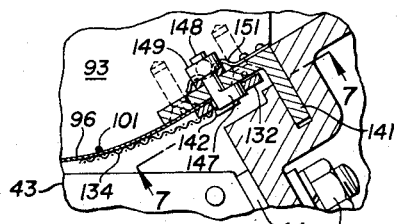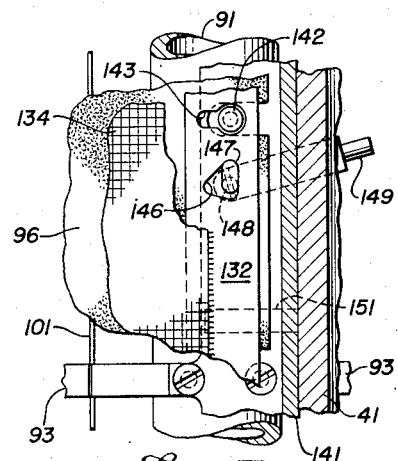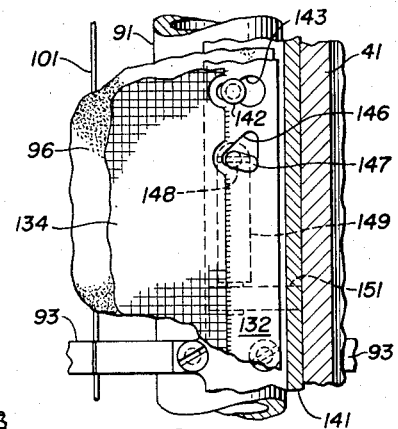
Fig. 6.
Fig. 7.
Fig. 8.
Fig. 9.
INVENTOR.
ELLIOTT G. REID
BY
Roland A. Anderson
ATTORNEY.

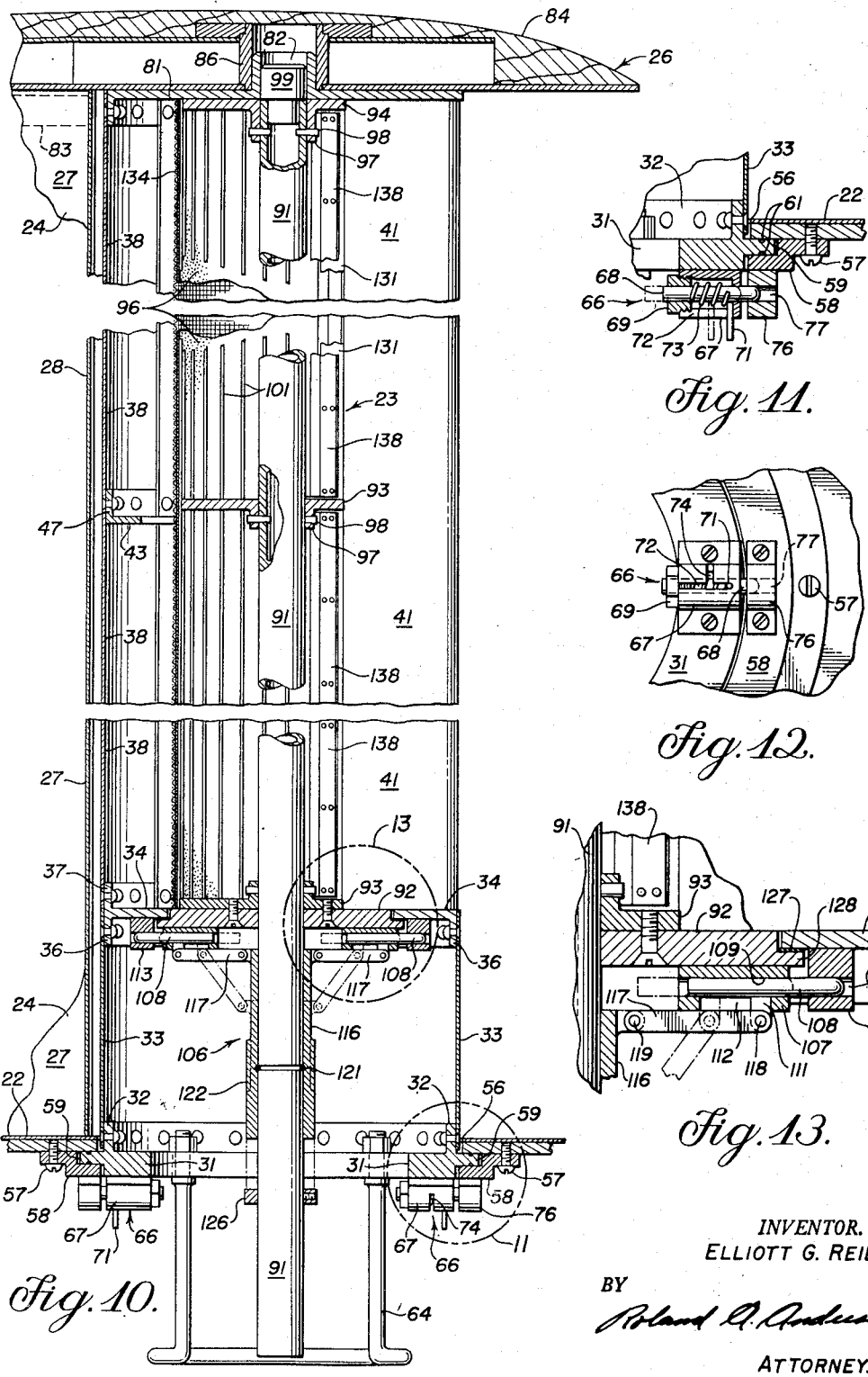

Patented July 21, 1953

2,645,941

UNITED STATES PATENT OFFICE 2,645,941

ATMOSPHERIC DUST COLLECTOR

Elliott G. Reid, Palo Alto, Calif., assignor to the United States of America as represented by the United States Atomic Energy Commission Application June 19, 1952, Serial No. 294,350

5 Claims. (Cl. 73—170)

1

The present invention relates to an airborne device for collecting samples of atmospheric dust.

With the advent of atomic weapons it has become increasingly important to obtain samples of atmospheric dust. For such purpose an airborne device has been provided which is mounted within a streamlined body which, in turn, may be mounted on the external surface of an aircraft, preferably on the top thereof with no objects forward on the aircraft to disturb the airstream. Mounted within such body is a rotatable cylinder having an intake opening and an outlet with a filter disposed across the path therebetween. There is also provided means for removing and replacing filters while the aircraft is in motion.

It is therefore an object of the present invention to provide a new and improved device for collecting samples of atmospheric dust.

Another object of the invention is to provide a dust sampling device which may be mounted on the external surface of an aircraft.

A further object of the invention is to provide an airborne dust sampling device wherein the flow of air therethrough is readily controlled.

A still further object of the invention is to provide an airborne dust sampling device having a collection filter which may be readily changed while the aircraft is in flight.

Other objects and advantages of the invention will be readily apparent in the following description and claims considered together with the accompanying drawing, in which:

Figure 6 is an enlarged, fragmentary, and detailed view as enclosed within the circle 6 of Fig. 3;

Figure 7 is a fragmentary view of the locking mechanism for the filter as taken along the line 7—7 of Fig. 6 with such mechanism in the open position;

Figure 8 is a second fragmentary view of the locking mechanism of Fig. 7 with such mechanism in the closed position;

Figure 9 is a sectional elevation of the invention, taken along the line 9—9 of Fig. 3;

2

Figure 3:
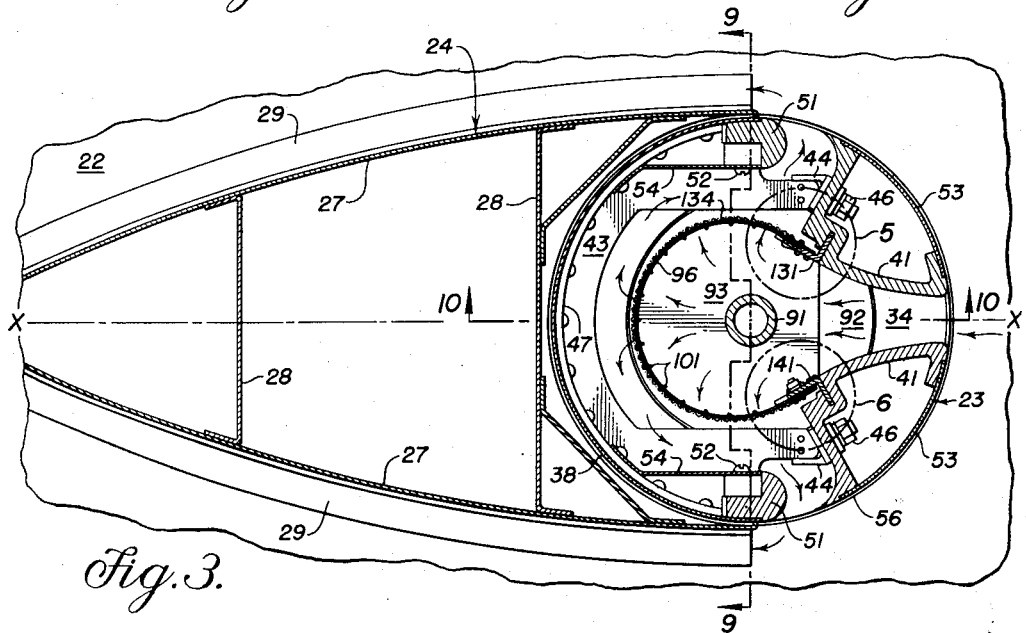
Figure 3 is a sectional plan view taken below the cover plate of Fig. 2 and with the cylinder in the intake position.

Figure 10 is a sectional elevation of the invention, taken along the line 10—10 of Fig. 3;

Figure 11 is a sectional fragmentary view of the cylinder locking mechanism as enclosed in the circle 11 of Fig. 10;

Figure 12 is a bottom view of the mechanism of Fig. 11; and

Figure 13 is a sectional fragmentary view of the locking mechanism for the filter holding structure enclosed in the circle 13 of Fig. 10.

Figure 1:
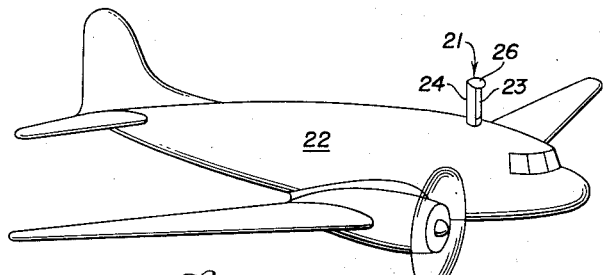
Figure 1 is a perspective view of an aircraft with the present invention mounted thereon.

Referring to the drawing in detail, and to Fig. 1 in particular, there is provided a streamlined device 21 for collecting samples of atmospheric dust which is mounted upon the outer surface of an aircraft 22. Preferably the device 21 is vertically mounted on the top surface of the aircraft 22 in such a position that there are no objects mounted forward thereof to disturb the airstream. Such device 21 comprises, in general, a rotatable cylindrical forward portion 23, a fixed streamlined afterbody 24, and a cover plate 26.

The afterbody 24 may be formed of an aluminum sheet 27 folded along a center line with the two portions thereof extended along smooth curves symmetrically disposed about a line X—X (see Fig. 3) and with the extended sides spaced apart a distance substantially equal to the diameter of the cylindrical portion 23. A plurality of strengthening frames 28 of suitable dimensions may be fastened within the shell thus formed to increase the rigidity thereof. Such afterbody 24 is then disposed vertically upon the fuselage of the aircraft 22 in a desired position with the line X—X extended parallel to the center-line (not shown) of the aircraft and with the converging portion of the sheet 27 extended toward the tail structure of the aircraft. Suitable mounting means, such as aluminum angles 29 having a strip form, may then be riveted to both the aluminum sheet 27 and the fuselage skin of the aircraft 22 to maintain the afterbody 24 in a rigid position thereon.

To support the elements of the cylindrical forward portion 23 there is provided a circular base ring 31 (see Figs. 9 and 10) having a flange 32 extending transversely from the outer circumference thereof. A cylindrically formed sheet 33 of lightweight material, such as aluminum, is mounted by means of rivets at the lower portion thereof to the flange 32 of the base ring 31. A circular ring plate 34 is provided and is suitably mounted, as by rivets, to the upper portion of the cylinder 33 along a downward projected flange 36 of the plate. Such circular ring plate 34 is also provided with a semicircular flange 37 extending upward therefrom. As a partial cover there is suitably mounted, as by rivets or the like, on the upwardly extended flange 37 the bottom portion of an elongated semicylindrical sheet 38 of lightweight material, such as aluminum.

Figure 4:
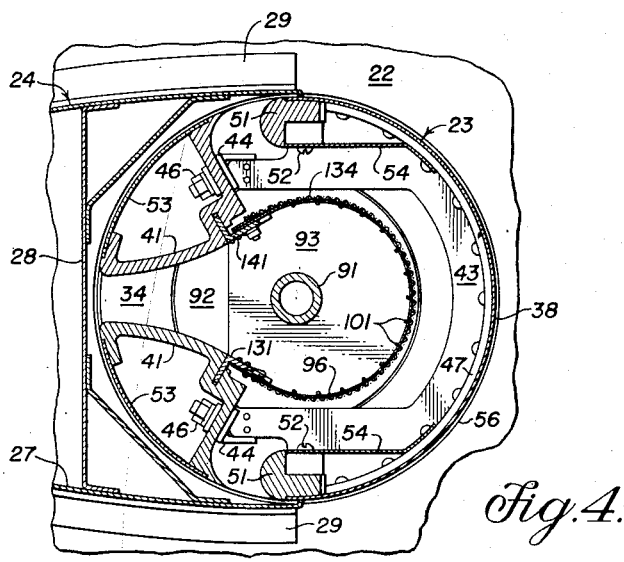
Figure 4 is a sectional plan view similar to Fig. 3 with the cylinder rotated to the closed position.

Two elongated nose castings 41, having substantially right-angular cross section (see Figs. 3 and 4), are suitably mounted, in opposing relation, transversely on the circular plate 34 and in spaced-apart symmetry with respect to a diameter of such plate which is transverse to the diameter spanned by the sides of the cover sheet 38. Also, it is preferable that the elongated edges of the nose castings 41 be rounded to conform to the curvature of the circumference of the circular ring plate 34. The nose castings 41, thus disposed, provide a diffuser through which atmosphere may flow with a minimum amount of turbulence. To maintain the position of the nose castings 41 and also to strengthen the cover sheet 38, a plurality of ribs 43 having a substantially U-shaped form are provided. The end of the legs of the ribs 43 carry fittings 44 which may be respectively fastened to the nose castings 41 by nuts 46, while the cross member thereof is provided with a semicircular flange 47 to receive rivets extending through the cover sheet 36.

Two elongated exit castings 51 of L-shape and having one rounded side are suitably mounted on the circular plate 34 at the extremities of the diameter thereof spanned by the sides of the cover sheet 38 and extended parallel to the nose castings 41. To strengthen the position of the exit castings 51 suitable bolt fasteners 52 are provided between the castings and the ribs 43. Preferably the rounded side of the exit castings 51 are spaced apart from the nose castings 41 and provide therebetween an elongated opening through which air entering the cylindrical portion 23 may escape. To complete the general plan of streamlining insofar as the cylindrical portion 23 is involved, the edges of the semicylindrical sheet 38 are faired into the respective exit castings 51 and two sheets 53 of similar material, such as aluminum, are provided to be faired into and suitably mounted between the legs of each of the nose castings 41 along the circumference of the cylindrical portion 23. Also baffles 54, of aluminum sheet or like material, may be mounted between the exit castings 51 and the aluminum sheet 38 to provide minimum internal turbulence of air flowing through the chamber thus formed.

For the purpose of permitting access to the internal chamber of the cylindrical portion 23 and control of the position thereof from the inside of the aircraft 22, the circular base ring 31 is rotatably mounted within an opening 56 in the fuselage of the aircraft 22. Such mounting may be readily accomplished by securing with bolts 57 a retaining ring 58 about the opening 56 in such a manner that a circular channel is provided to rotatably retain a flange 59 extended from the circumference of the base ring 31 in the plane thereof. Preferably the bearing surfaces of the flange 59 of the base ring 31 are lubricated by providing grooves 61 connected to grease fittings 62 by communicating passages 63. Two handles 64 are bolted to the base ring 31 in diametrically opposing relation and are extended toward the interior of the aircraft 22. Thus the cylindrical portion 23 is freely rotatable from the inside of the aircraft 22.

For the collection of dust particles from the atmosphere, it is only necessary that the cylindrical portion 23 be rotatable to two different positions. One such position, to be referenced as the closed position, is characterized by the diffuser formed by the two nose castings 41 being rotated so that no air can enter and the other such position, to be referenced as the open or intake position, is characterized by the diffuser being rotated to a forward position to permit the entrance of air thereinto. To permit accurate position control of the cylindrical portion 23 from the inside of the aircraft, a pair of oppositely disposed locking mechanisms 66 are mounted on the inboard sides of the base ring 31 and the retaining ring 58 (see Figs. 10, 11, and 12). Such locking mechanisms 66 may comprise a housing 67 suitably mounted, as by bolts, on the base ring 31 and having a bolt 68 extending therethrough parallel to the base thereof. One end of the housing 67 is provided with a plug 69 which limits movement of the bolt in one direction and, to limit movement in the other direction, a pin 71 is mounted on the bolt to extend transversely therefrom through a longitudinal slot 72 in the housing 67. To maintain the bolt 68 in an extended position a compression spring 73 is mounted about the bolt between the plug 69 and pin 71 and to provide means for locking the bolt in a withdrawn position a second slot 74 extends transversely of the longitudinal slot 72 to allow entrance of the pin. A cooperating keeper 76, having an opening 77 to engage the extended end of the bolt 68, is suitably mounted, as by bolts, on the retaining ring 58. By proper positioning of the two diametrically opposing locking mechanisms 66 the two positions of the cylindrical portion 23 may be manually obtained from within the aircraft 22 by 180 degrees rotation.

Figure 2:
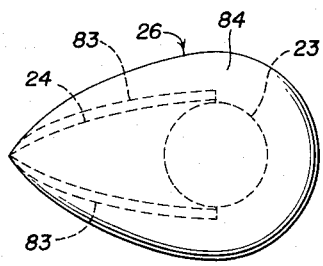
Figure 2 is a plan view of the assembled invention of Fig. 1.

A top plate 81 having a circular configuration is suitably mounted on the uppermost portions of the cover sheet 38, nose castings 41, and exit castings 51 to provide further strengthening of the structure and to carry a centrally disposed tubular journal 82. The cover plate 26 is rigidly mounted on the top portion of the afterbody portion, as by angles 83 riveted thereto, so as to have a flush fit at the tail portion and a curved forward profile with a slight overhang (see Figs. 2, 9, and 10). Mounted on the cover plate 26 is a smoothly contoured covering 84, of lightweight material such as balsa wood, to provide a minimum of resistance to passage through the air. Rigidly mounted within the cover plate 26 is a tubular bearing 86 disposed to receive the journal 82.

Disposed within the forward portion 23 is a removable filter holding structure which comprises, in general, a central tubular shaft 91, a bottom plate 92, a plurality of intermediate plates 93, an upper plate 94, and a sheet of filter paper 96. The upper plate 94 is mounted upon the shaft 91 at one end thereof and is fastened in position by a hub portion 97 having a plurality of apertures through which pins 98 may be extended to engage openings in the shaft. A pilot 99 is provided to be inserted at one end into the end of the shaft 91 and to engage the inner dimension of the journal 82 thereby properly centering the shaft in the cylindrical forward portion 23. The intermediate plates 93 are similarly mounted on the shaft 91 at spaced-apart positions with the distance between the lowermost thereof and the upper plate 94 being substantially equal to the elongated dimension of the nose castings 41. Preferably such plates 92, 93, and 94 are disposed with a straight portion of the periphery thereof spanning the space between the nose castings 41 substantially at the innermost projection thereof and with a substantially circular portion extending rearward from the straight portion (see Figs. 3 and 4). A plurality of parallel wires 101 are swaged into aligned slots about the curved periphery of the plates 93 and 94 to form a substantially semicircular cage open only at the throat of the diffuser.

To lock the foregoing structure within the cylindrical forward portion 23, the circular bottom plate 92 is suitably secured to the lowermost intermediate plate 93, as by bolts, and is provided with a locking mechanism 106 (see Fig. 13). Two oppositely disposed blocks 107 suitably mounted along a diameter of the bottom plate 92 carry bolts 108 radially extended through bores 109 therein. Each bolt 108 is provided with a transverse arm 111 which extends through a slot 112 in the respective blocks 107 parallel to the bolt therein. Disposed to receive one end of such bolts 108 are keepers 113, having bores 114 therein suitably mounted on the circular ring plate 34. A movable sleeve 116 is provided about the lower extended portion of the shaft 91. To control the position of the bolts 108 links 117 are respectively and pivotally connected thereto at one end by pins 118 and at the other end pivotally connected by pins 119 to the uppermost portion of the sleeve 116. The length of the links 117 is chosen so that the bolts 108 engage the keepers 113 when the sleeve is maintained in the uppermost position. Thus by sliding the sleeve 116 downward on the shaft 91 the bolts 108 are withdrawn from the keeper and the unitary filter holding structure mounted on the shaft 91 may be removed from the cylindrical forward portion 23 of the device. Preferably both the sleeve 116 and the shaft 91 are grooved so that a snap ring 121 disposed within the groove of the latter will expand to maintain the sleeve in the uppermost position with the bolts 108 engaging the keepers 113. Also for ease in grasping the sleeve 116 when removing the filter holding structure a portion 122 thereof may be knurled. A stop ring 126 is mounted, as by set screws, on the shaft 91 such as to limit the downward position of the sleeve 116. To prevent air and particles dispersed therein from entering the aircraft 22 a gasket 127 of resilient material is disposed between a flanged portion 128 of the bottom plate 92 and circular ring plate 34. Two guide pins 129 (see Fig. 9) suitably secured, as by nuts, to the bottom plate 92 and intermediate plate 93 secured thereto, are provided to project through oppositely disposed and aligned bores in flanged portions 130 of the sleeve 116.

Figure 5:
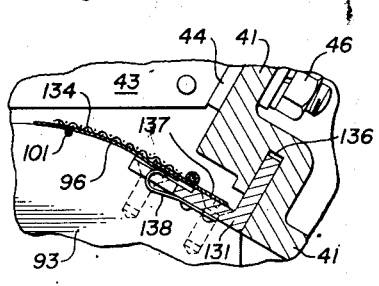
Figure 5 is an enlarged, fragmentary, and detailed view as enclosed within the circle 5 of Fig. 3.

With the structure described in the foregoing assembled in the manner set forth, the sheet of filter paper 96 may be disposed about the semicircular cage formed by the parallel wires 101. To maintain such filter paper 96 in position against the pressure of incoming air there is provided a carrier therefor which comprises in general a frame, having two rigid side members 131 and 132 and two flexible side members (not shown), and a wire mesh 134 mounted therein. Preferably one of the rigid side members 131 is an elongated metallic strip having a right angular cross-section with one of the legs adapted to slidably engage a slot 136 extending longitudinally in one of the nose castings 41 substantially along the apex thereof. One side of a piano type hinge 137 (see Fig. 5) is soldered along the inside face of the rigid side member 131 and strips of spring stock in the form of springs 138 are soldered to the opposite face to press against such hinge when in the extended position. Also one side of the wire mesh 134 is soldered along the free side of the hinge 137 to secure the same. Thus one side of the filter paper 96 may be readily secured between the springs 138 and hinge 137. To render such filter carrier structure unitary with the above-described filter holder structure the rigid side member 131 is secured, as by screws, to the top and intermediate plates 94 and 93, respectively.

Provided as a fastening means for the other rigid side member 132 is an elongated metallic strip 141 having a right angular cross-section and being similar in such respects to the rigid side member 131 (see Fig. 6). One of the legs of the angular strip 141 is adapted to slidably ride in a slot in the other nose casting 41 along the apex thereof while the other leg is secured, as by screws, to the top and intermediate plates 94 and 93, respectively. Mounted on the leg of the angular strip 141, intermediate of the points of attachment to the plates 94 and 93 and on the opposite side therefrom, are a plurality of pins 142 having enlarged heads thereon. The rigid side member 132 is provided with key-hole openings 143 which are in alignment with the pins 142 and may be slipped thereover to contour the wire mesh 134 about the cage formed by the parallel wires 101. To lock the rigid side member 132 to the angular strip 141 a substantially triangular aperture 146 is provided adjacent each of the key-hole openings 143 to engage the eccentric head 147 of a pin 148. To rotate the pin 148 there is provided a lever 149 secured at the other end thereof. Preferably the pin 148 and lever 149 are assembled so that when the lever is parallel with the angular strip 141 the eccentric pin 148 has forced the narrow portion of the pin 142 into the narrow portion of the key-hole opening 143. To maintain the locked position of the lever 149 a strip spring 151 having an indented portion is secured, as by screws, transversely on the metallic strip 141 so that the lever rests in such indented portion. Thus the filter paper 96 may be firmly held against the parallel wires 101 by means of the wire mesh 134 and held firmly along one side by means of the hinge 137 and springs 138 and along the other side by the pressure between the rigid member 132 and angular strip 141.

Now consider the invention as suitably installed upon the surface of an aircraft 22. Prior to taking off from the home base it is preferable that the cylindrical forward portion 23 be rotated so that no air can enter the diffuser formed by the two nose castings 41. A filter may be inserted either before or after the aircraft 22 is airborne and the procedure is the same in both instances. It is to be noted that the air intake between the nose castings 41 is positioned above the fuselage of the aircraft 22 a certain distance which is determined by the thickness of the sluggish layer of air adjacent the fuselage.

With a sheet of filter paper 96 in place a sample of atmospheric particles may be collected by rotating the cylindrical forward portion 23 through 180 degrees to the intake position. Such rotation may be accomplished by pressing the pins 71 against the springs 73 and then rotating the same into the transverse slots 74 so that the bolts 68 are free of the keepers 76. In such manner the cylindrical forward portion 23 may be rotated to the intake position and locked by again inserting the bolts 68 into engagement with the keepers 76. It is to be noted that when the cylindrical forward portion 23 is in the intake position the diffuser formed by the nose castings 41 is at the location of greatest pressure whereas the exit opening formed between the exit castings 51 and the adjacent portion of the nose casting is at the location of minimum pressure. In such manner, then, air enters through the diffuser and flows through the filter paper 96, leaving particles thereon, to exit through the exit opening. After sufficient time has elapsed for a representative sample to have been collected the cylindrical forward portion 23 is again revolved, in the manner set forth above, by 180 degrees to the closed position.

Should it then be desired to remove the sheet of filter paper 96, it is necessary to force the sleeve 116 downward to withdraw the bolts 108 from the keepers 113. Such action permits withdrawal of the filter holding structure as a unit through the opening of the base ring 31. Next it is necessary to rotate the levers 149 to release the rigid side member 132 from its position against the angular strip 141. The sheet of filter paper 96 may then be readily removed and a new sheet inserted. Reassembly of the apparatus for obtaining a second sample may be readily accomplished by following the reverse of the foregoing procedure.

While the salient features of the present invention have been described in detail with respect to one embodiment it will, of course, be readily apparent that numerous modifications may be made within the spirit and scope of the invention and it is therefore not desired to limit the invention to the exact details shown except insofar as they may be defined in the following claims.

What is claimed is:

1. An airborne device for collecting samples of atmospheric dust, comprising a housing mounted rotatably on the fuselage of an aircraft, streamlining means mounted about said housing to minimize air turbulence, means mounted within an opening of said housing to provide a diffuser opening, means mounted within openings in said housing and disposed substantially 90 degrees on either side of said diffuser means to provide outlets, a sheet of filter pipe disposed within said housing between said diffuser and outlet means to collect dust particles, and means connected to said housing for selectively locking said housing in intake or closed position.

2. An airborne device for collecting samples of atmospheric dust, comprising a cylindrical housing mounted on the fuselage of an aircraft, streamlining means disposed about said housing to minimize air turbulence, means mounted within an opening of said housing for forming an air intake, means mounted within two diametrically opposed openings of said housing for forming air outlets, a removable filter mounted within said housing between said air intake and outlets to collect dust particles, and means connected to said housing for rotating said housing to an intake and a closed position.

3. An airborne device for collecting samples of atmospheric dust, comprising a cylindrical housing, means mounted at one end of said housing for rotatably mounting said housing within an opening in the fuselage of an aircraft, streamlining means disposed about said housing to minimize air turbulence, means mounted within an opening of said housing for forming an air intake, means mounted within two diametrically opposed openings of said housing for forming air outlets, a removable filter means mounted within said housing between said air intake and outlets to collect dust particles, means connected to said filter means for securing said filter within said housing, and means connected to said housing for rotating said housing to an intake and a closed position.

4. An airborne device for collecting samples of atmospheric dust, comprising an elongated cylindrical housing, means attached to said housing for rotatably mounting said housing within an opening in the fuselage of an aircraft transversely thereof, streamlining means secured to said fuselage and partially disposed about said housing to minimize air turbulence, means mounted within an opening of said housing for forming an elongated air intake, means mounted within two diametrically opposed openings of said housing for forming air outlets, a removable filter holding structure disposed within said housing, a sheet of filter paper disposed partially about said structure between said intake and outlets, screen means hingedly mounted at one side to said structure and adapted to clamp along the opposite side thereof to said structure for maintaining said filter in position against said structure, and means mounted on said housing and extended within said aircraft for rotating said housing to an intake and a closed position.

5. An airborne device for collecting samples of atmospheric dust, comprising an elongated cylindrical housing rotatably mounted within an opening in the fuselage of an aircraft, streamlining means mounted on said fuselage and partially disposed about said housing, means mounted within an opening of said housing for forming an air intake, means mounted within two diametrically opposed openings of said housing for forming air outlets, a filter holding structure adapted to be disposed longitudinally with said housing between said air intake and outlets, a locking mechanism controllable from inside said aircraft and mounted between said structure and housing to provide a unitary structure, a filter removably secured to said structure, and means mounted on said housing within said aircraft for rotating said air intake from a high pressure area to a low pressure area.

ELLIOTT G. REID.

References Cited in the file of this patent

UNITED STATES PATENTS

| Number | Name | Date |
|---|---|---|
| 2,058,659 | Bellanca | Oct. 27, 1936 |
| 2,468,021 | Black | Apr. 26, 1949 |
| 2,492,768 | Schaefer | Dec. 27, 1949 |